United States Patent
Makino et al.

(10) Patent No.: US 9,830,069 B2
(45) Date of Patent: Nov. 28, 2017

(54) INFORMATION PROCESSING APPARATUS FOR AUTOMATICALLY SWITCHING BETWEEN MODES BASED ON A POSITION OF AN INPUTTED DRAG OPERATION

(71) Applicant: CASIO COMPUTER CO., LTD., Shibuya-ku, Tokyo (JP)

(72) Inventors: Tetsuji Makino, Tokyo (JP); Kouichi Nakagome, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 195 days.

(21) Appl. No.: 14/159,254

(22) Filed: Jan. 20, 2014

(65) Prior Publication Data
US 2014/0208277 A1 Jul. 24, 2014

(30) Foreign Application Priority Data

Jan. 22, 2013 (JP) .................................. 2013-009452

(51) Int. Cl.
G06F 3/00 (2006.01)
G06F 3/048 (2013.01)
(Continued)

(52) U.S. Cl.
CPC .......... *G06F 3/0488* (2013.01); *G06F 3/0485* (2013.01); *G06F 3/04845* (2013.01); *G06F 2203/04808* (2013.01)

(58) Field of Classification Search
None
See application file for complete search history.

(56) References Cited

U.S. PATENT DOCUMENTS 5,196,838 A * 3/1993 Meier ................. G06F 3/04812
345/684
5,867,158 A * 2/1999 Murasaki .............. G06F 3/0485
715/784
(Continued)

FOREIGN PATENT DOCUMENTS

CN 101030119 A 9/2007
JP 07-271008 A 10/1995
(Continued)

OTHER PUBLICATIONS

Korean Office Action (and English translation thereof) dated Mar. 24, 2015, issued in counterpart Korean Application No. 10-2014-0007327.
(Continued)

*Primary Examiner* — Yongjia Pan
(74) *Attorney, Agent, or Firm* — Holtz, Holtz & Volek PC (57) ABSTRACT

An information processing apparatus of the present application includes a drawing unit that draws a line on an image in a drawing area displayed in a fixed mode, which displays an image by fixing a position of the image; a judgment unit that judges whether a position of the line during drawing by the drawing unit is positioned on a boundary indicating the drawing area; a mode switching unit that switches from the fixed mode to a predetermined mode other than the fixed mode in a case in which the position during drawing is judged as being positioned on the boundary indicating the drawing area by the judgment unit; and a display control unit that executes control to display the image based on the mode switched by the mode switching unit.

8 Claims, 8 Drawing Sheets

(51) Int. Cl.
*G06F 3/033* (2013.01)
*G06F 3/0488* (2013.01)
*G06F 3/0484* (2013.01)
*G06F 3/0485* (2013.01)
*G06F 3/14* (2006.01)

(56) References Cited

U.S. PATENT DOCUMENTS

| | | | | |
|---|---|---|---|---|
| 6,847,386 | B2* | 1/2005 | Paleiov | G06F 3/0485 345/684 |
| 7,032,187 | B2* | 4/2006 | Keely, Jr. | G06F 3/0483 345/179 |
| 7,164,410 | B2* | 1/2007 | Kupka | G06F 3/0231 345/156 |
| 7,519,920 | B2* | 4/2009 | Jarrett | G06F 3/0485 715/784 |
| 8,286,101 | B2* | 10/2012 | Kupka | G06F 3/0231 345/173 |
| 8,375,336 | B2* | 2/2013 | Matthews | G06F 3/0488 715/863 |
| 8,910,068 | B2* | 12/2014 | Shin | G06F 3/04883 715/765 |
| 2003/0169280 | A1* | 9/2003 | Hsieh | G06F 3/0485 345/684 |
| 2004/0227738 | A1* | 11/2004 | Sudoh | G06F 3/0481 345/173 |
| 2004/0263486 | A1* | 12/2004 | Seni | G06F 3/0485 345/173 |
| 2005/0088418 | A1* | 4/2005 | Nguyen | G06F 3/03545 345/173 |
| 2007/0091075 | A1* | 4/2007 | Lii | G06F 3/0416 345/173 |
| 2008/0129712 | A1* | 6/2008 | Nguyen | G06F 3/0488 345/179 |
| 2009/0085886 | A1* | 4/2009 | Huang | G06F 3/04886 345/173 |
| 2010/0295805 | A1* | 11/2010 | Shin | G06F 3/04883 345/173 |
| 2011/0039602 | A1* | 2/2011 | McNamara | G06F 3/017 455/566 |
| 2011/0128244 | A1* | 6/2011 | Cho | G06F 1/1626 345/173 |
| 2012/0127107 | A1 | 5/2012 | Miyashita et al. | |
| 2013/0016129 | A1* | 1/2013 | Gossweiler, III | G06F 3/012 345/667 |
| 2013/0042199 | A1* | 2/2013 | Fong | G06F 3/0488 715/780 |
| 2014/0137029 | A1* | 5/2014 | Stephenson | G06F 3/0482 715/784 |
| 2014/0189579 | A1* | 7/2014 | Rimon | G06F 3/0485 715/784 |

FOREIGN PATENT DOCUMENTS

| | | |
|---|---|---|
| JP | 07-334308 A | 12/1995 |
| JP | 2007025023 A | 2/2007 |
| KR | 1020120050971 A | 5/2012 |
| WO | 2004029791 A2 | 4/2004 |

OTHER PUBLICATIONS

Japanese Office Action dated Dec. 24, 2014, issued in counterpart Japanese Application No. 2013-009452.
Chinese Office Action (and English translation thereof) dated Jun. 2, 2016, issued in counterpart Chinese Application No. 201410027685.9.

* cited by examiner

FIG. 9

INFORMATION PROCESSING APPARATUS FOR AUTOMATICALLY SWITCHING BETWEEN MODES BASED ON A POSITION OF AN INPUTTED DRAG OPERATION

This application claims priority based on Japanese Patent Application No. 2013-009452, filed on Jan. 22, 2013, which is incorporated by reference herein in its entirety.

BACKGROUND OF THE INVENTION

Field of the Invention

The present invention relates to an information processing apparatus.

Related Art

Conventionally, an information processing apparatus such as a personal computer having a display unit with a large screen executes various image processing on an image such as a picture. As one type of application software executing such image processing, there is application software that performs clipping of picture data (object) from an image (for example, refer to Japanese Unexamined Patent Application, Publication No. H07-271008).

On the other hand, demands for an information processing apparatus including a touch screen layered on a liquid crystal display have increased recently. An information processing apparatus executes processing relating to an object displayed on a display unit based on operations in which a finger of a user or an object such as a stylus pen is contacted on a touch screen (for example, refer to Japanese Unexamined Patent Application, Publication H07-334308).

Reductions in the size of such an information processing apparatus having a touch screen have advanced with recent sophistication in the field of information processing, a result of which an information processing apparatus for which a smart phone is representative has appeared of which the size is so small that the entire chassis can be carried and held by one hand.

SUMMARY OF THE INVENTION

An aspect of the present application is an information processing apparatus that includes a drawing unit that draws a line on an image in a drawing area displayed in a fixed mode, which displays an image by fixing a position of the image; a judgment unit that judges whether a position of the line during drawing by the drawing unit is positioned on a boundary indicating the drawing area; a mode switching unit that switches from the fixed mode to a predetermined mode other than the fixed mode in a case in which the position during drawing is judged as being positioned on the boundary indicating the drawing area by the judgment unit; and a display control unit that executes control to display the image based on the mode switched by the mode switching unit.

DETAILED DESCRIPTION OF THE INVENTION

Figure 1:
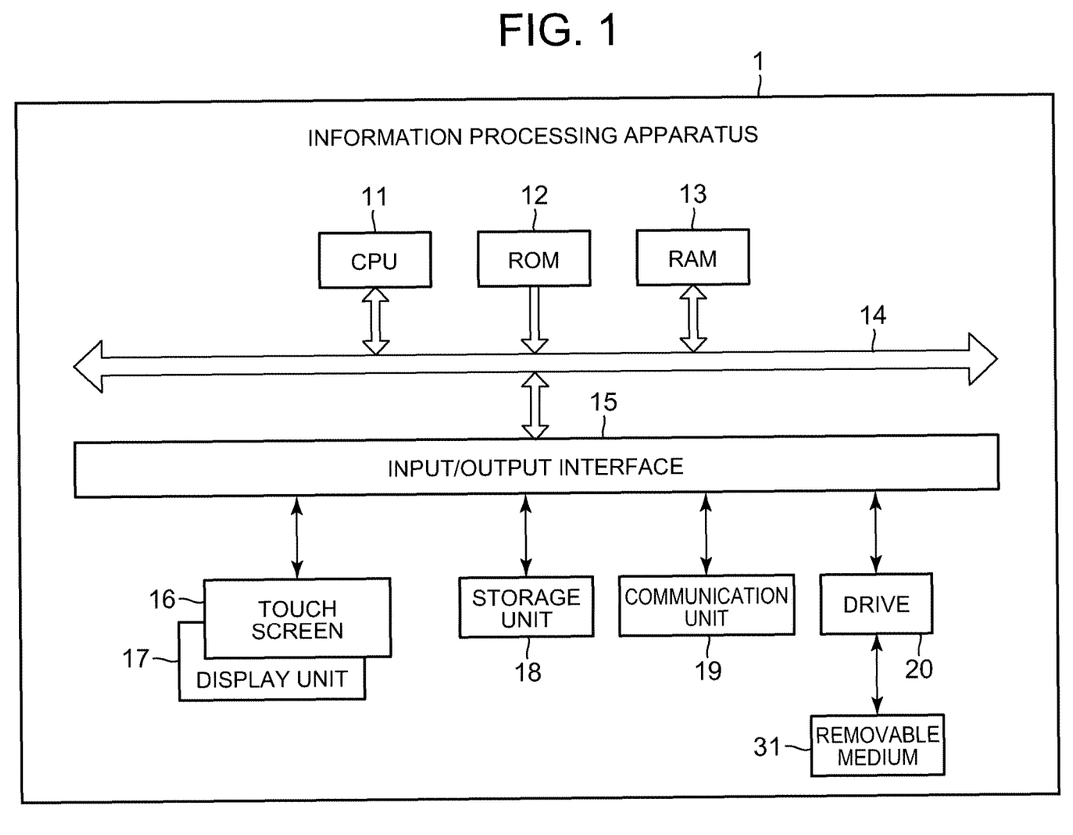
FIG. 1 is a block diagram showing a hardware configuration of an information processing apparatus according to an embodiment of the present invention.

In the following, an embodiment of the present invention is described with reference to the drawings as appropriate. FIG. 1 is a block diagram showing a hardware configuration of an information processing apparatus according to an embodiment of the present invention. An information processing apparatus 1 is configured as, for example, a smart phone.

The information processing apparatus 1 includes a CPU (Central Processing Unit) 11, ROM (Read Only Memory) 12, RAM (Random Access Memory) 13, a bus 14, an Input/Output interface 15, a touch screen 16, a display unit 17, a storage unit 18, a communication unit 19, and a drive 20.

The CPU 11 executes various processing according to programs that are recorded in the ROM 12, or programs that are loaded from the storage unit 18 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The touch screen 16, the display unit 17, the storage unit 18, the communication unit 19, and the drive 20 are connected to the input/output interface 15.

The touch screen 16 is configured to include a capacitive or resistive touch screen that is laminated on a display screen of the display unit 17. The touch screen detects the coordinates of a position where a touch operation is performed (hereinafter referred to as "touch position"). In this regard, the touch operation refers to an operation of touching or approaching an object (a finger or stylus of a user) on the touch screen 16. The touch screen 16 has so-called a multi-touch function that can detect a plurality of positions of coordinates of touch positions that are operated around the same period.

The display unit 17 is configured by a display to display images.

The storage unit 18 is configured by hard disk, DRAM (Dynamic Random Access Memory) or the like, and stores data of various images.

The communication unit 19 controls communication with other devices (not shown) via networks including the Internet.

A removable medium 31 composed of a magnetic disk, an optical disk, a magneto-optical disk, semiconductor memory or the like is installed in the drive 20, as appropriate. Programs that are read via the drive 20 from the removable medium 31 are installed in the storage unit 18, as necessary. Similarly to the storage unit 18, the removable medium 31 can also store a variety of data such as the image data stored in the storage unit 18.

The CPU 11 of the information processing apparatus 1 with such a configuration can execute image processing of clipping an object area from an original image, which is an image including an object area such as a person. Such image processing is hereinafter called "clip processing".

The CPU 11 generates composite image data by compositing data of an object area clipped from the original image by way of such clip processing with new image data that is separate from the original image (new background image, etc.).

Upon executing such clip processing, it is necessary for the CPU 11 to designate an object area for clipping from the original image. Therefore, the CPU 11 executes a sequence of processing as follows.

The CPU 11 reads data of the original image from the storage unit 18 and displays the original image on the display unit 17.

In this state, the user performs a touch operation to make the user's finger, etc. along a boundary that distinguishes an object area in the image displayed on the display unit 17 from other areas (hereinafter, referred to as "drag operation" since it is similar to a drag operation of a mouse).

The CPU 11 draws a line along a trajectory of the drag operation. Then, the CPU 11 causes an image in which the line drawn along the trajectory of the drag operation to be displayed on the display unit 17 (hereinafter, referred to as "trajectory drawing image") and causes data of the trajectory drawing image to be stored in the storage unit 18.

Such a sequence of processing is hereinafter referred to as "trajectory drawing image generation processing".

An area surrounded by the line drawn in the trajectory drawing image generated by the trajectory drawing image generation processing is designated as an object area that is clipped by the clip processing.

Figure 2:
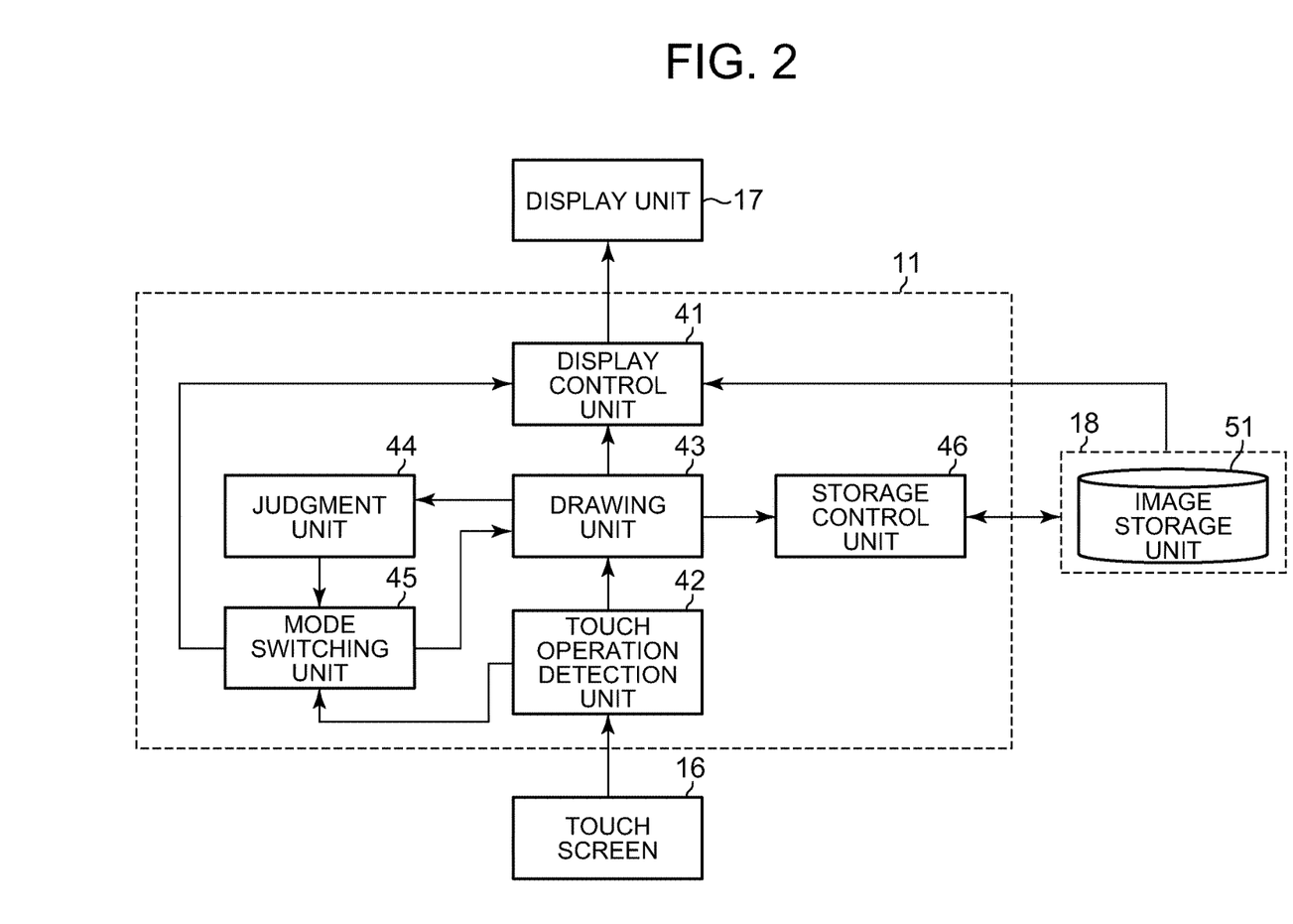
FIG. 2 is a functional block diagram showing a functional configuration for executing trajectory drawing image generation processing among the functional configurations of the information processing apparatus of FIG. 1.

FIG. 2 is a functional block diagram showing a functional configuration for executing such trajectory drawing image generation processing among the functional configurations of the information processing apparatus.

In a case in which the execution of the trajectory drawing image generation processing is controlled, a display control unit 41, a touch operation detection unit 42, a drawing unit 43, a judgment unit 44, a mode switching unit 45, and a storage control unit 46 function in the CPU 11.

As an area of the storage unit 18, an image storage unit 51 is provided that stores data of various images that can be an original image for the clip processing.

The display control unit 41 reads data of a predetermined image from the image storage unit 51 and controls to display the image as an original image in the clip processing on the display unit 17.

The touch operation detection unit 42 detects that a touch operation by the user was made on the touch screen 16 and identifies the position of the touch operation. The touch operation detection unit 42 can detect an operation of touching or approaching an object (a finger or a stylus pen of the user) on the touch screen 16 (hereinafter, referred to as "touch down") and an operation of releasing the object (a finger or a stylus pen of the user) from being in the state of touch down on the touch screen 16 (hereinafter, referred to as "touch up"). The touch operation detection unit 42 can detect the operations of touch down and touch up that are performed around the same time several times on the touch panel 16. The touch operation detection unit 42 transmits information relating to touch up and touch down detected to the drawing unit 43 and the mode switching unit 45.

The judgment unit 44 judges whether a position during drawing is located on a boundary of a drawing area.

The mode switching unit 45 switches a mode to one among a plurality of modes including a fixed mode of displaying an image being fixed and a scroll mode of displaying an image being scrolled based on a judgment result by the judgment unit 44.

The "fixed mode" refers to a mode of displaying an image being fixed on the display unit 17 regardless of flick operation, slide operation, swipe operation, etc. of an object on the touch screen 16 (a finger or a stylus of the user).

The "scroll mode" refers to a mode of displaying an image being scrolled in an arbitrary direction on the display unit 17 in response to the flick operation, slide operation, swipe operation, or the like of the object on the touch screen 16 (a finger or a stylus of the user).

When the judgment unit 44 judges that the position in the image during drawing is located on the boundary of the drawing area, the mode switching unit 45 switches the current mode from the fixed mode to the scroll mode.

Furthermore, if a so-called multi-touch, which performs a plurality of touch operations around the same period, is detected during the scroll mode, the mode switching unit 45 switches the current mode to the fixed mode.

Furthermore, the mode switching unit 45 switches a mode from one among a plurality of modes including the fixed mode and the scroll mode in response to the number of two-finger operations that are continuously detected by the touch operation detection 42. For example, the mode switching unit 45 switches the current mode to the fixed mode in a case of detecting continuously two-finger touch operations twice by way of the touch operation detection unit 42. On the other hand, the mode switching unit 45 switches the current mode to the scroll mode in a case of detecting continuously two-finger touch operations three times. The mode switching unit 45 supplies information of the mode switched to the drawing unit 43 and the display control unit 41.

The processing of the mode switching unit 45 switching the current mode to one among the fixed mode and the scroll mode is hereinafter referred to as "mode switching processing".

FIGS. 3A to 3C, 4A to 4C, and 5A to 5C are front views of the information processing apparatus 1 which show an outline of a case of switching a current mode from the fixed mode or the scroll mode by way of the mode switching processing.

Figure 3A:
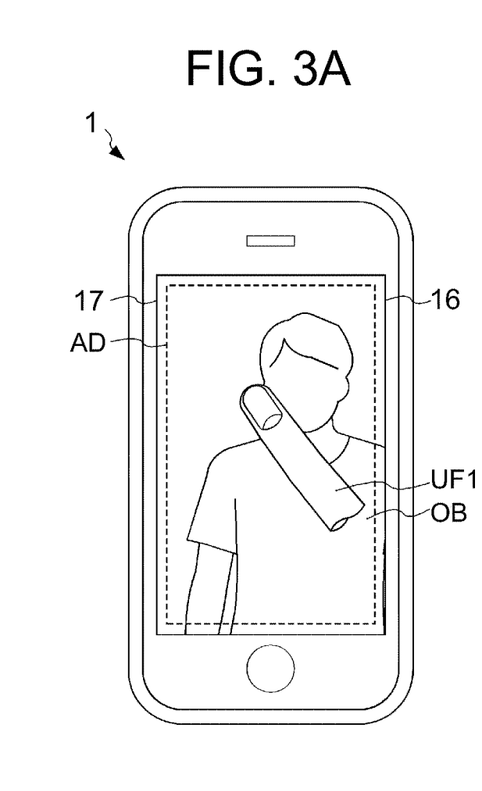
FIGS. 3A to 3C are front views of the information processing apparatus which show an overview of a case of switching a current mode from fixed mode or scroll mode by way of mode switching processing.

As shown in FIG. 3A, in a drawing area AD on the display unit 17, an original image including an object area OB showing a human upper body is displayed so as to be overlapped along with a transparent layer. The drawing unit 43 can set the drawing area AD to an arbitrary domain based on an operation by a user on the touch screen 16.

In such a state of FIG. 3, the user starts a touch operation by a first finger UF1 on an outer circumference of the object area OB displayed on the drawing area AD.

With reference to FIG. 2 again, the drawing unit 43 generates data of a start point L1 of a line of a contact position of the first finger UF1. The processing of the drawing unit 43 generating data of a line at a predetermined position on the display unit 17 in this way is described as "drawing a line at a predetermined position".

The display control unit 41 displays the start point L1 of the line so as to be superimposed on the contact position of the first finger UF1 in the object area OB of the original image. More specifically, the display control unit 41 displays the start point L1 of the line at the contact position of the first finger UF1 on the transparent layer.

Figure 3B:
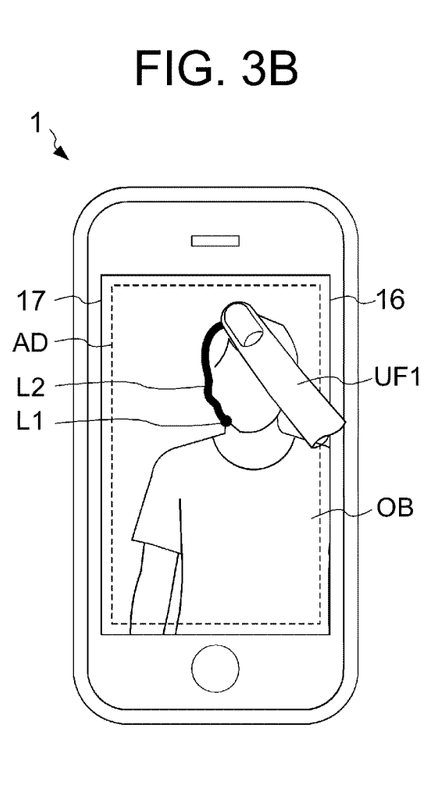
Figure 3C:
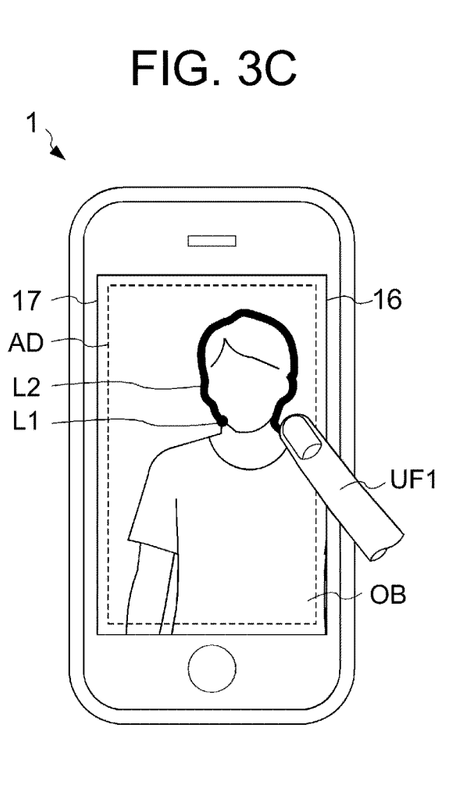

Thereafter, as shown in FIG. 3B, a line L2 is drawn along the trajectory of the movement of the first finger UF1 by a drag operation, and as shown in FIG. 3C, the line L2 is displayed on an outer circumference of the object area OB.

As shown in FIG. 3C, when the position of the finger UF1 further moves by the drag operation and the position of the finger UF1, i.e. the position during drawing of the line L2 by the drawing unit 43, reaches a boundary of the drawing area AD, the judgment unit 44 judges that the position during drawing is positioned on the boundary of the drawing area AD and the current mode is switched from the fixed mode to the scroll mode.

It should be noted that there is a case in which the movement speed of the finger UF1 is so fast that the finger UF1 exceeds the boundary of the drawing area AD before the judgment unit 44 judges that the finger is positioned on the boundary of the drawing area AD. In the present embodiment, a domain in which the position of the finger UF1 that moves while the drag operation can be detected is provided as a domain AM that is broader than the drawing area AD so that it is possible for the judgment unit 44 to appropriately judge that the finger is positioned on the boundary of the drawing area AD in such a case. Such a domain AM is hereinafter referred to as movement detection domain AM.

In other words, the drawing unit 43 calculates a scroll amount at the time when the current mode is switched to the scroll mode by the mode switching unit 45 or in a case in which the position at which the line is drawn by the drawing unit 43 is moved by scrolling to a predetermined position.

In the present embodiment, with a predetermined position when the line L2 reaches the predetermined position on the boundary of the predetermined drawing area AD (the position shown in FIG. 3C) as a start point, and then, with a point at which a touch position that moves along the trajectory of the movement of the first finger UF1 by the drag operation of the user ceases as an end point, the movement amount for the scroll movement from the start point to the end point is calculated as a scroll amount.

Figure 4A:
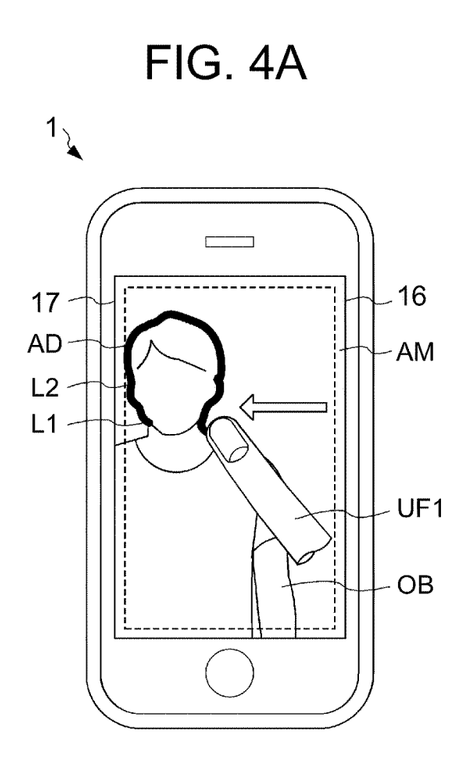
FIGS. 4A to 4C are front views of the information processing apparatus which show an overview of a case of switching a current mode from fixed mode or scroll mode by way of mode switching processing.

As shown in FIG. 4A, the display control unit 41 scrolls the original image and the line superimposed thereon (transparent layer) in accordance with the scroll amount calculated by the drawing unit 43 to be displayed on the display unit 17.

Figure 4B:
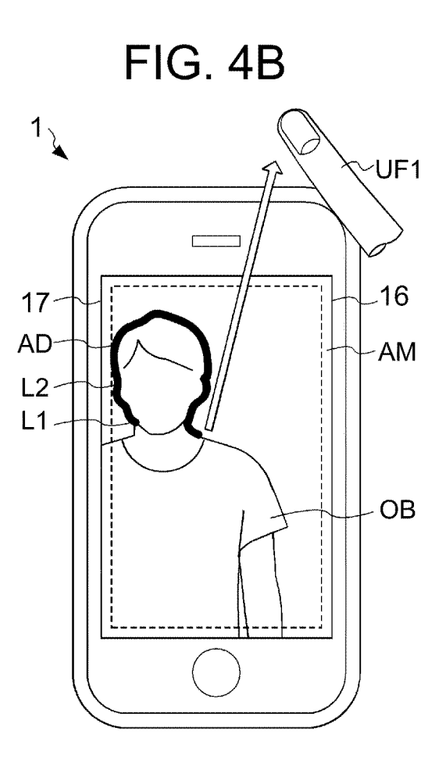

Thereafter, as shown in FIG. 4B, in a case in which the touch operation by the touch operation detection unit 42 cannot be detected since the user performs touch up by the finger UF1 during the scroll mode, the mode switching unit 45 switches the current mode to the fixed mode.

Figure 4C:
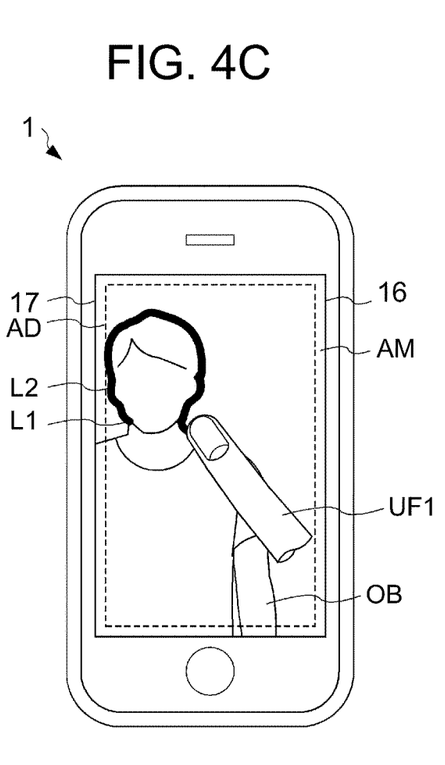

Furthermore, as shown in FIG. 4C, in a case in which the touch position detected by the touch operation detection unit 42 does not change for a predetermined period of time since the user does not move the finger UF1 for a predetermined period of time during the scroll mode, the mode switching unit 45 switches the current mode to the fixed mode. The user can arbitrarily set the predetermined time beforehand by operating the touch screen 16.

Figure 5A:
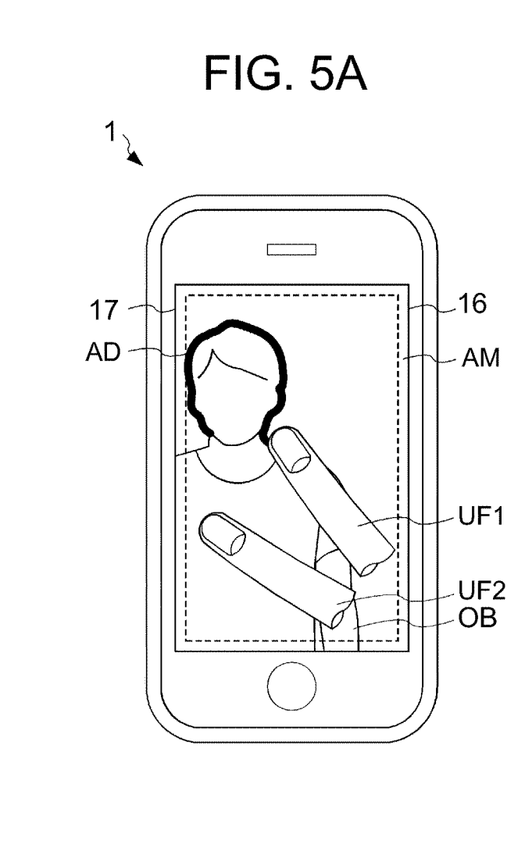
FIGS. 5A to 5C are front views of the information processing apparatus which show an overview of a case of switching a current mode from fixed mode or scroll mode by way of mode switching processing.

Furthermore, as shown in FIG. 5A, in a case in which the touch operation detection unit 42 detects two-finger touch operations at about the same time due to the user performing the touch operation by the finger UF1 as well as another finger UF2 during the scroll mode, the mode switching unit 45 switches the current mode to the fixed mode. In such a case, it is possible to perform the two-finger touch operation by performing another touch operation by the finger UF2 while holding the previous touch position by the finger UF1.

Figure 5B:
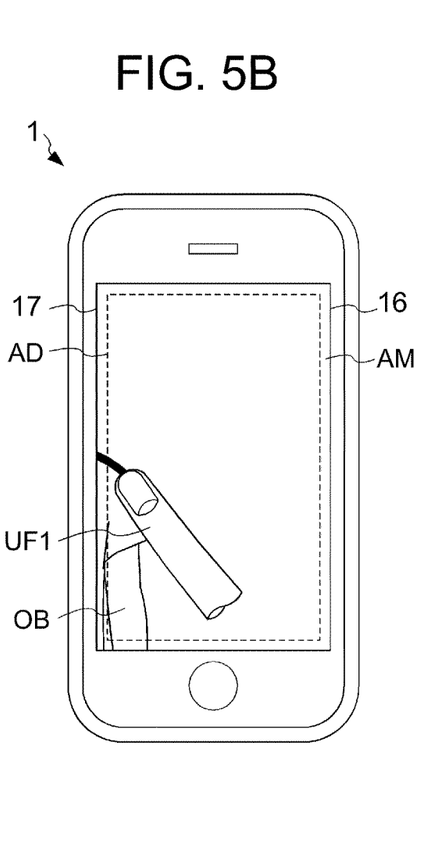
Figure 5C:
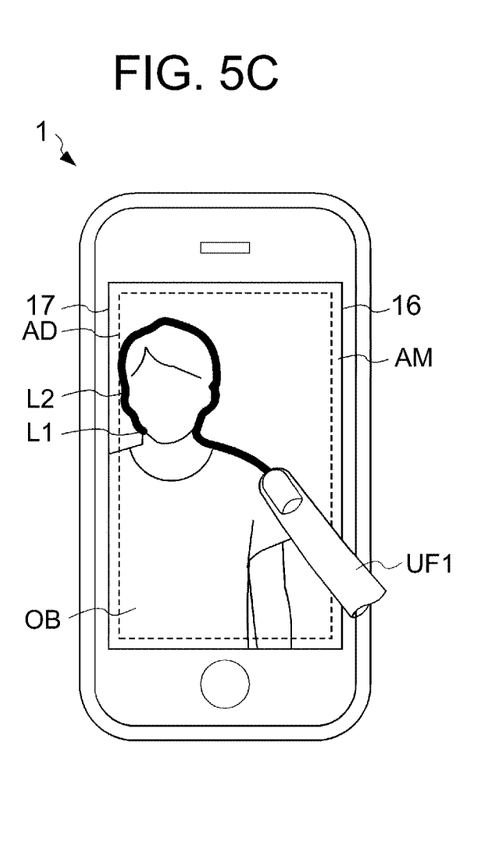

Furthermore, as shown in FIG. 5B, in a case in which the touch operation detection unit 42 detects a touch operation around the drawing area AD displayed on the display unit 17 due to the user performing a drag operation by the finger UF1 during the scroll mode, the mode switching unit 45 switches the current mode to the fixed mode again. As shown in FIG. 5C, it is possible to draw the line L2 continuously by switching the current mode to the fixed mode.

It should be noted that the display control unit 41 displays an image in a different color in response to a mode switched by the mode switching unit 45. In the present embodiment, the display control unit 41 displays a background image of the drawing area AD in red in a case in which the mode switching unit 45 switches the current mode to the scroll mode. On the other hand, the display control unit4 41 displays the background image of the drawing area AD in white in a case in which the mode switching unit 45 switches the current mode to the fixed mode.

To summarize the scroll display processing of an original image, in order to designate an object area that is clipped by the clip processing, it is necessary for the user to perform a drag operation such as moving the first finger UF1 along the boundary line of the object.

However, the drag operation often cannot be executed continuously in the state in which the line L2 drawn almost reaches an edge portion of the drawing area AD.

For this reason, it is necessary to set a boundary line which is not designated by the drag operation (not touched by the first finger UF1) to be included in the drawing area AD constantly by repeating to perform the scroll display on the original image.

As shown in FIG. 3C, conventionally, when the position of the first finger UF1, i.e. the position during drawing of the line L2 by the drawing unit 43 almost reaches the end portion of the drawing area AD by the drag operation, a user would stop the drag operation for drawing a line, switch the operation mode of the drag operation, and scroll the original image by the drag operation (drawing a line by the drag operation is blocked during this).

However, such a sequence of operations of stopping the drag operation for drawing a line, switching the operation mode of the drag operation, and repeating scrolling the original image by a drag operation is cumbersome as well as troublesome for the user, requiring great effort. Furthermore, even if performing touch up for switching the operation mode or performing touch down on the same touch position sequentially after performing touch up for scrolling an image automatically, it is likely that the touch position is displaced, a result of which it was difficult to continuously perform the drag operation while maintaining the continuity of the line.

Therefore, in the present embodiment, it is configured to execute the mode switching processing solely without changing the touch position of the first finger UF1 so that the current mode can be switched from the fixed mode to the scroll mode, a result of which the operational burden on the user is reduced.

Then, when a predetermined instruction for ending is made, the storage control unit 48 of FIG. 2 stores data of the original image in which the line L2 is superimposed on the boundary line of the object area in the image storage unit 51 as data of a trajectory drawing image.

In this way, the CPU 11 of the information processing apparatus 1 is configured such that it is possible to clip an object area from the original image by executing the clip processing using the data of the trajectory drawing image at an arbitrary timing thereafter.

Figure 6:
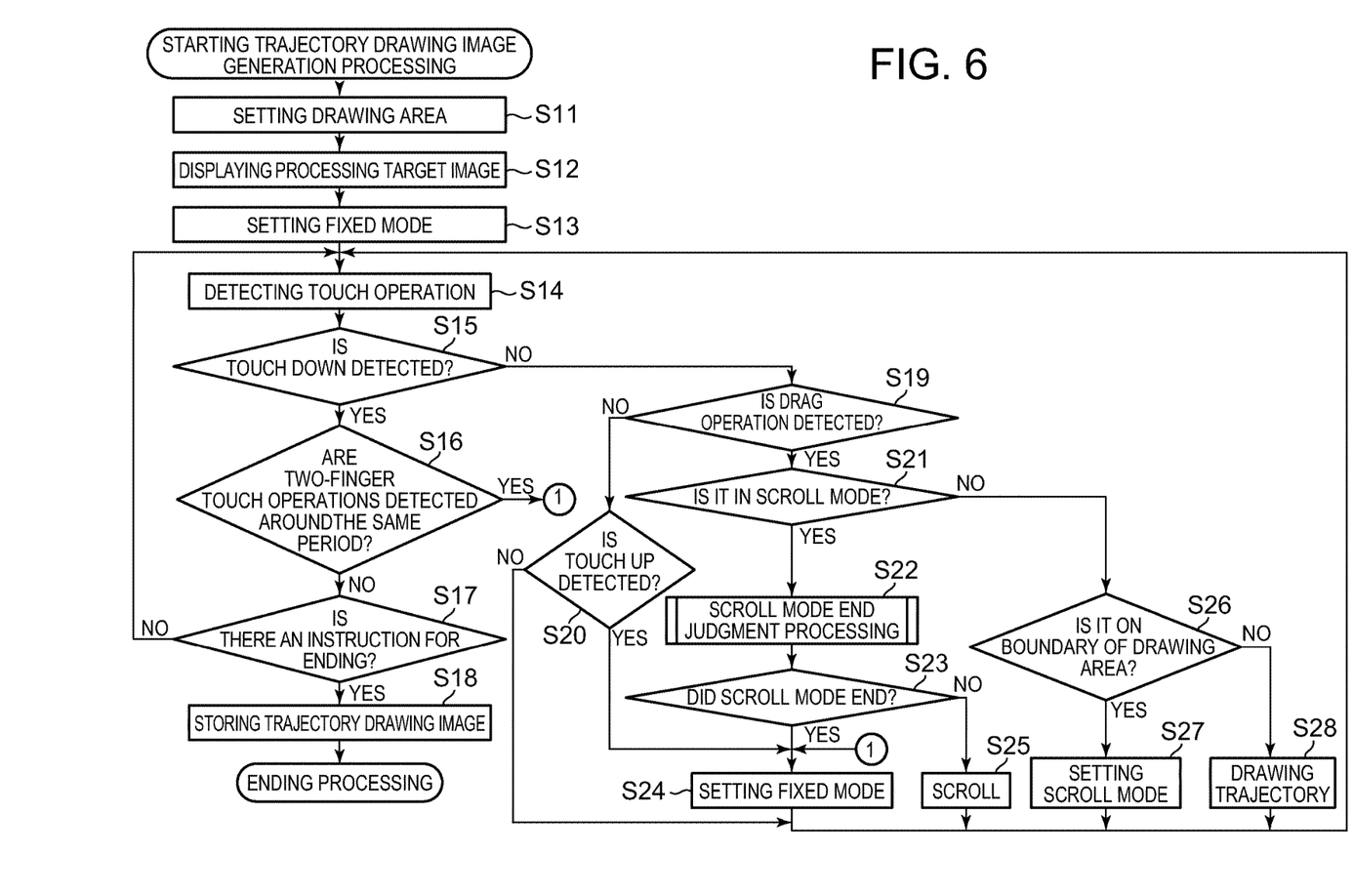
FIG. 6 is a flowchart showing a flow of the trajectory drawing image generation processing executed by the information processing apparatus of FIG. 1 having the functional configuration of FIG. 2.

Next, with reference to FIG. 6, trajectory drawing image generation processing that is executed by the information processing apparatus 1 with the functional configuration of FIG. 2 is described.

FIG. 6 is a flowchart showing a flow of trajectory drawing image generation processing executed by the information processing apparatus 1 of FIG. 1 having the functional configuration of FIG. 2.

The trajectory drawing image generation processing starts when a predetermined operation is made on the touch screen 16 by the user, and the following processing is executed.

In Step S11, the drawing unit 43 sets the drawing area AD (FIGS. 3A to 3C/FIGS. 4A to 4C/FIGS. 5A to 5C) based on the operation on the touch screen 16 by the user.

In Step S12, the display control unit 41 reads data of an original image from the storage unit 18 and displays the original image as a processing target (hereinafter, referred to as "processing target image") on the display unit 17.

In Step S13, the mode switching unit 45 switches the current mode to the fixed mode to set to the fixed mode. When the current mode is switched to the fixed mode, the display control unit 41 displays a line drawn along a trajectory of a movement of a finger by a drag operation on the processing target image.

In Step S14, the touch operation detection unit 42 detects a touch operation performed on the touch screen 16 by the user.

In Step S15, the touch operation detection unit 42 judges whether the touch operation detected in Step S14 is touch down. In a case in which the touch operation is not touch down, it is judged as NO in Step S15, and the processing advances to Step S19. The processing of Step S19 and higher is described later. In a case in which the touch operation is touch down, it is judged as YES in Step S15, and the processing advances to Step S16.

In Step S16, the touch operation detection unit 42 judges whether two-finger touch operations are detected around the same time. In this processing, the touch operation detection unit 42 judges whether the two-finger touch operation was performed by performing the touch operation on another touch position by another finger UF2 while holding the previous touch position by a finger UF1. In a case in which the two-finger touch operations are detected around the same time, it is judged as YES in Step S16, and the processing advances to Step S24. The processing of Step S24 and higher is described later. In a case in which two-finger touch operations are not detected around the same time, it is judged as NO in Step S16, and the processing advances to Step S17.

In Step S17, it is judged whether an instruction for ending was received. In a case in which the instruction for ending was not received, it is judged as NO in Step S17, and the processing returns back to Step S14. On the other hand, in a case in which an instruction for ending was received, it is judged as YES in Step S17, and the processing advances to Step S18.

In Step S18, the storage control unit 48 stores the data of the processing target image in which a line is drawn in the image storage unit 51 as a trajectory drawing image. When this processing ends, the trajectory drawing image generation processing ends. In other words, if touch down is performed, the processing of Step S14 to Step S17 is repeatedly executed until touch down is released or the instruction for ending is received, and the drawing image generation processing enters the standby state.

In Step S19, the touch operation detection unit 42 judges whether the drag operation was performed. If the drag operation was performed, it is judged as YES in Step S19, and the processing advances to Step S21. The processing of Step S21 and higher is described later. On the other hand, if the drag operation was not performed, it is judged as NO in Step S19, and the processing advances to Step S20.

In Step S20, the touch operation detection unit 42 judges whether touch up was performed. If touch up was not performed, it is judged as NO in Step S20, and the processing returns back to Step S14. On the other hand, if touch up was performed, it is judged as YES in Step S20, and the processing advances to Step S24. The processing of Step S24 and higher is described later.

In Step S21, the mode switching unit 45 judges whether the current mode is in the scroll mode. If it is not in the scroll mode, i.e. in the fixed mode, it is judged as NO in Step S21, and the processing advances to S26. The processing of Step S26 and higher is described later. On the other hand, if it is in the scroll mode, it is judged as YES in Step S21, and the processing advances to Step S22.

In Step S22, the mode switching unit 45 performs scroll mode end judgment processing, which is described with reference to FIG. 7 described later. In this processing, the mode switching unit 45 performs processing of setting a scroll mode end flag for ending the scroll mode in a case in which a touch position does not change for a predetermined period of time.

In Step S23, the mode switching unit 45 judges whether the scroll mode ended. In this processing, the mode switching unit 45 judges whether the scroll mode ended by judging whether the scroll mode end flag was set. In a case in which the scroll mode end flag was set and the scroll mode ended, it is judged as YES in Step S23, and the processing advances to Step S24.

In Step S24, the mode switching unit 45 switches the current mode to fixed mode to set to the fixed mode. When this processing ends, the processing returns back to Step S14.

In a case in which the scroll mode end flag was not set and the scroll mode did not end, it is judged as NO in Step S23, and the processing advances to Step S25.

In Step S25, the display control unit 41 performs control to display an image being scrolled in an arbitrary direction on the display unit 17 in response to the flick operation, slide operation, swipe operation, or the like of an object on the touch screen 16 (a finger or a stylus of the user). When this processing ends, the processing returns back to Step S14.

In Step S26, the judgment unit 44 judges whether a touch position during drawing is positioned on a boundary of the drawing area AD (FIG. 3C). In a case in which the touch position during drawing is positioned on the boundary of the drawing area AD, it is judged as YES in Step S26, and the processing advances to Step S27. On the other hand, in a case in which the touch position during drawing is not positioned on the boundary of the drawing area AD, it is judged as NO in Step S26, and the processing advances to Step S28.

In Step S27, the mode switching unit 45 switches the current mode to the scroll mode to set to the scroll mode. When this processing ends, the processing returns back to Step S14.

In Step S28, the drawing unit 43 draws a line L2 along a trajectory of a movement of a finger UF1 by the drag operation by a user. Then, the display control unit 41 executes control to display the line drawn on the display unit 17. When this processing ends, the processing returns back to Step S14.

Figure 7:
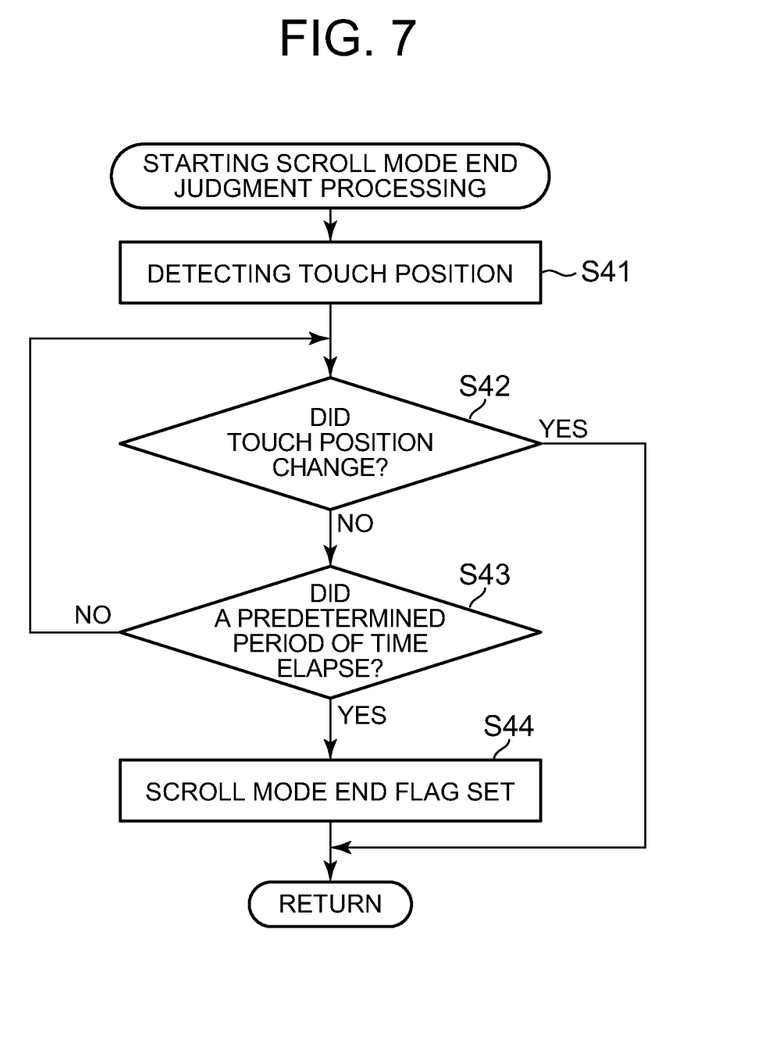
FIG. 7 is a flowchart showing a flow of the scroll mode end judgment processing executed by the information processing apparatus of FIG. 1 having the functional configuration of FIG. 2.

Next, with reference to FIG. 7, the scroll mode end judgment processing that is performed in Step S22 of FIG. 6 executed by the information processing apparatus 1 with the functional configuration of FIG. 2 is described.

FIG. 7 is a flowchart showing a flow of the scroll mode end judgment processing executed by the information processing apparatus 1 of FIG. 1 having the functional configuration of FIG. 2.

The scroll mode end judgment processing starts when it is judged as being in the scroll mode in Step S21 of FIG. 6, and the following processing executed.

In Step S41, the touch operation detection unit 42 detects a touch position.

In Step S42, the touch operation detection unit 42 judges whether the touch position detected in Step S41 changed. In this processing, the touch operation detection unit 42 judges whether the touch position changed by the user moving a finger. In a case in which the touch position changed, it is judged as YES in Step S42, and the scroll mode end judgment processing ends. On the other hand, in a case in which the touch position did not change, it is judged as NO in Step S42, and the processing advances to Step S43.

In Step S43, the touch operation detection unit 42 judges whether a predetermined period of time elapsed. In a case in which a predetermined period of time did not elapse, it is judged as NO in Step S43, and the processing advances to Step S42. In other words, in a case in which the touch position did not change, the processing of Step S42 and Step S43 is repeatedly executed until a predetermined period of time elapsed, and the scroll mode end judgment processing enters the standby state. On the other hand, in a case in which a predetermined period of time elapsed, it is judged as YES in Step S43, and the processing advances to Step S44.

In Step S44, the mode switching unit 45 sets the scroll mode end flag. When this processing ends, the scroll mode end judgment processing ends, and the processing advances to Step S23 of FIG. 6.

As described above, the information processing apparatus 1 of the present embodiment includes the drawing unit 43, the judgment unit 44, the mode switching unit 45, and the display control unit 41.

The drawing unit 43 draws a line on an image in the drawing area AD displayed during the fixed mode. The judgment unit 44 judges whether a position during drawing of the line by the drawing unit 43 is positioned on a boundary line of the drawing area AD. In a case in which the position during drawing is judged as being positioned on the boundary line of the drawing area AD by the judgment unit 44, the mode switching unit 45 switches the mode from the fixed mode to a predetermined mode other than the fixed mode. The display control unit 41 executes control to display an image based on the mode switched by the mode switching unit 45.

In this way, it is possible for the user to switch from the fixed mode to a predetermined mode automatically in a case in which the position during drawing in the fixed mode is positioned on the boundary of the drawing area AD. Therefore, even in a case in which the mode is switched from the fixed mode to a predetermined mode other than the fixed mode, it is possible to switch an operation mode without changing the touch position of the first finger UF1 of the user, a result of which the operational burden is reduced. With such a configuration, it is possible to easily switch a mode for displaying an image while maintaining operational continuity.

Furthermore, a predetermined mode that is switched by the switch unit 45 of the information processing apparatus 1 of the present embodiment is a scroll mode that displays an image by scrolling.

It is thereby possible for the user to switch to the scroll mode automatically in a case in which the position during drawing in the fixed mode is positioned on the boundary of the drawing area AD. Therefore, even in a case in which the mode is switched from the fixed mode to the scroll mode, it is possible to switch an operation mode without changing the touch position of the first finger UF1 of the user, a result of which operational burden is reduced. It is thereby possible to easily switch a mode for displaying an image while maintaining operational continuity.

Furthermore, the information processing apparatus 1 of the present embodiment further includes the touch operation detection unit 42. The touch operation detection unit 42 detects an operation of touch or approaching an object as a touch operation. Then, the mode switching unit 45 switches to the fixed mode in a case in which the touch operation cannot be detected by the touch operation detection unit 42 during the scroll mode.

With such a configuration, it is possible for the user to switch to the fixed mode automatically by performing touch up. Therefore, it is possible to change to the fixed mode by performing touch up by the finger UF1 of the user, a result of which the operational burden is reduced. It is thereby possible to easily switch a mode for displaying an image while maintaining operational continuity.

Furthermore, the mode switching unit 45 of the information processing apparatus 1 of the present embodiment switches to the fixed mode in a case in which the position of the touch operation detected by the touch operation detection unit 42 during the scroll mode does not change for a predetermined period of time.

It is thereby possible for the user to switch to the fixed mode automatically by entering the standby state without changing the touch position for a predetermined period of time. Therefore, even if the mode is switched from the scroll mode to the fixed mode, it is possible for the user to switch the operation mode without changing the touch position of the finger UF1 of the user, a result of which the operational burden is reduced. It is thereby possible to easily switch a mode for displaying an image while maintaining operational continuity.

Furthermore, the mode switching unit 45 of the information processing apparatus 1 of the present embodiment switches to the fixed mode when a plurality of touch operations is detected by the touch operation detection unit 42 around the same time in the scroll mode.

With such a configuration, if the user desires to switch to the fixed mode, it is possible to easily switch to the fixed mode by changing the number of touch operations by way of increasing or decreasing the number of fingers performing touch down. Therefore, even if the mode is switched from the fixed mode to the scroll mode, it is possible for the user to switch the operation mode by adding a touch operation of the second finger UF2 without changing the touch position of the finger UF1 of the user, a result of which operational load can be reduced. It is thereby possible to easily switch a mode for displaying an image while maintaining operational continuity.

Furthermore, the mode switching unit 45 of the information processing apparatus 1 of the present embodiment switches the mode in response to the number of the two-finger operations that are continuously detected by the touch operation detection unit 42.

It is thereby possible to scroll an image by changing the number of touch operations of the two-finger operations. Therefore, it is possible to continuously draw a line while maintaining the continuity of the line without changing the touch position.

It should be noted that the present invention is not to be limited to the aforementioned embodiment, and that modifications, improvements, etc. within a scope that can achieve the object of the present invention are also included in the present invention.

In the abovementioned embodiment, although the mode switching unit 45 switches to the fixed mode in a case in which the position of the touch operation detected by the touch operation detection unit 42 during the scroll mode does not change for a predetermined period of time, the present invention is not limited thereto. For example, it is possible to switch to the fixed mode upon scrolling an image to a circumferential area of the display unit during the scroll mode.

For example, as shown in FIG. 5B, when a touch operation is detected by the touch operation detection unit 42 at a circumferential area of the drawing area AD displayed by the display unit 17 by the user performing a drag operation with the finger UF1, the mode switching unit 45 switches the current mode to the fixed mode again. As shown in FIG. 5C, it is possible to draw the line L2 continuously by switching the current mode to the fixed mode.

Figure 8:
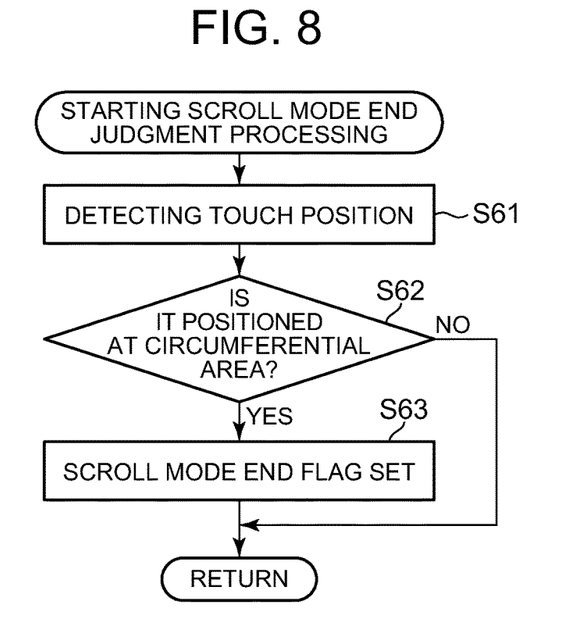
FIG. 8 is a flowchart showing a flow of the scroll mode end judgment processing of another embodiment executed by the information processing apparatus of FIG. 1 having the functional configuration of FIG. 2.

The information processing apparatus 1 having the mode switching unit 45 with such a configuration executes scroll mode end judgment processing of FIG. 8 in place of the scroll mode end judgment processing of FIG. 7.

With reference to FIG. 8, scroll mode end judgment processing of another embodiment which is performed in Step S22 of FIG. 6 executed by the information processing apparatus 1 with the functional configuration of FIG. 2 is described.

FIG. 8 is a flowchart showing a flow of the scroll mode end judgment processing in another embodiment executed by the information processing apparatus 1 of FIG. 1 having the functional configuration of FIG. 2.

The scroll mode end judgment processing starts when it is judged as being in the scroll mode in Step S21 of FIG. 6, and the following processing is executed.

In Step S61, the touch operation detection unit 42 detects a touch position.

In Step S62, the touch operation detection unit 42 judges whether the touch position detected in Step S61 is positioned at a circumferential area of the drawing area AD (FIG. 5B). In a case in which the touch position is not positioned at a circumferential area of the drawing area AD, it is judged as NO in Step S62, and the scroll mode end judgment processing ends. On the other hand, in a case in which the touch position is positioned at a circumferential area of the drawing area AD, it is judged as YES in Step S62, and the processing advances to Step S63.

In Step S63, the mode switching unit 45 sets a scroll mode end flag. When the processing ends, the scroll mode end judgment processing ends, and the processing advances to Step S23 of FIG. 6.

Furthermore, in the abovementioned embodiment, although the mode switching unit 45 switches to the fixed mode in a case in which the position of the touch operation detected by the touch operation detection unit 42 during the scroll mode does not change for a predetermined period of time, the present invention is not limited thereto. For example, it is possible to switch to the fixed mode upon scrolling an image to an arbitrary area in the scroll mode. It is possible for the user to set this arbitrary area freely by operating the touch panel 16. For example, it is possible for the user to set a circumference or a center of the field of view of the display unit 17 as an arbitrary area.

Figure 9:
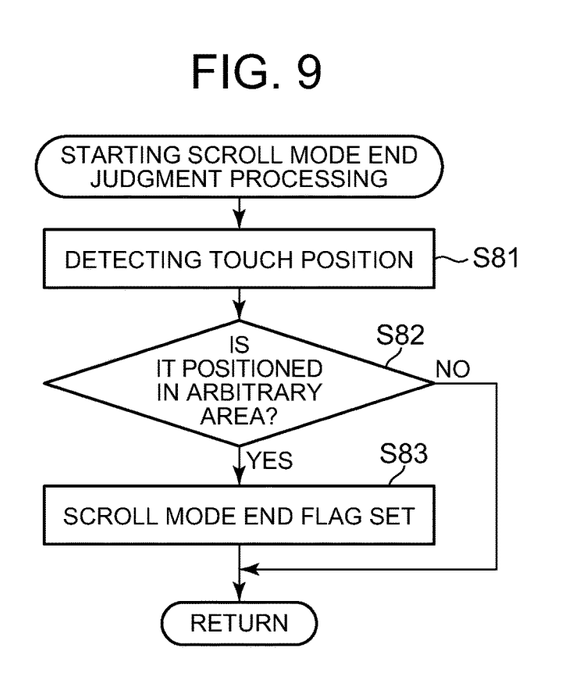
FIG. 9 is a flowchart showing a flow of the scroll mode end judgment processing of another embodiment executed by the information processing apparatus of FIG. 1 having the functional configuration of FIG. 2.

The information processing apparatus 1 having the mode switching unit 45 with such a configuration executes the scroll mode end judgment processing of FIG. 9 in place of the scroll mode end judgment processing of FIG. 7.

With reference to FIG. 9, scroll mode end judgment processing of another embodiment which is performed in Step S22 of FIG. 6 executed by the information processing apparatus 1 with the functional configuration of FIG. 2 is described.

FIG. 9 is a flowchart showing a flow of the scroll mode end judgment processing of another embodiment executed by the information processing apparatus 1 of FIG. 1 having the functional configuration of FIG. 2.

The scroll mode end judgment processing starts when it is judged as being in the scroll mode in Step S21 of FIG. 6, and the following processing is executed.

In Step S81, the touch operation detection unit 42 detects a touch position.

In Step S82, the touch operation detection unit 42 judges whether the touch position detected in Step S81 is an arbitrary area. In a case in which the touch position is not an arbitrary area, it is judged as NO in Step S82, and the scroll mode end judgment processing ends. On the other hand, in a case in which the touch position is an arbitrary area, it is judged as YES in Step S82, and the processing advances to Step S83.

In Step S83, the mode switching unit 45 sets a scroll mode end flag. When the processing ends, the scroll mode end judgment processing ends, and the processing advances to Step S23 of FIG. 6.

In the aforementioned embodiments, a smart phone has been described as an example of the information processing apparatus 1 to which the present invention is applied; however, the present invention is not particularly limited thereto.

For example, the present invention can be applied to any electronic apparatus in general having a display function. More specifically, for example, the present invention can be applied to a lap-top personal computer, a television, a video camera, a portable navigation device, a cell phone device, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the information processing apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 18 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, the term of system shall mean an entire apparatus configured from a plurality of devices, a plurality of means, and the like.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An information processing apparatus comprising:
a display;
a touch screen layered on the display; and
a processor which executes processes comprising:
a drag control process of selectively controlling the information processing apparatus to function in (i) a drag drawing mode in which a drawing image is drawn in a drawing area on the display by way of a drag operation by a user, and (ii) a drag scroll mode in which the drawing image drawn and displayed in the drawing area on the display is scrolled by way of the drag operation on the touch screen by the user;
a judgment process of judging whether a position of the drag operation by the user, while the information processing apparatus is functioning in the drag drawing mode under control of the drag control process, is positioned on a boundary indicating the drawing area; and
a drag mode switching process of automatically switching the drag control process from controlling in the drag drawing mode to controlling in the drag scroll mode without stopping the drag operation in a case in which the position of the drag operation by the user, while the information processing apparatus is functioning in the drag drawing mode under control of the drag control process, is judged in the judgement process to be positioned on the boundary indicating the drawing area,
wherein the drawing image in the drawing area on the display, drawn by way of the drag operation by the user, follows the drag operation by the user in the drag scroll mode, and the drawing image in the drawing area on the display, drawn by way of the drag operation by the user, is fixed in the drag drawing mode, and
wherein, by way of the drag mode switching process, the drag control process is automatically switched from controlling in the drag scroll mode to controlling in the drag drawing mode when the drawing image in the drawing area on the display is detected to be scrolled by the user to an arbitrary area defined by the user while the information processing apparatus is functioning in the drag scroll mode under control of the drag control process.

2. The information processing apparatus according to claim 1, wherein, by way of the drag mode switching process, the drag control process is automatically switched from controlling in the drag scroll mode to controlling in the drag drawing mode in a case in which the position of the drag operation on the touch screen by the user, while the information processing apparatus is functioning in the drag scroll mode under control of the drag control process, is detected to not have been changed for a predetermined period of time.

3. The information processing apparatus according to claim 1, wherein, by way of the drag mode switching process, the drag control process is automatically switched from controlling in the drag scroll mode to controlling in the drag drawing mode when touch operations are detected at a plurality of positions of the touch screen while the information processing apparatus is functioning in the drag scroll mode under control of the drag control process.

4. The information processing apparatus according to claim 1, wherein the arbitrary area defined by the user is one of (i) an area of the display freely set by the user, (ii) a circumferential area of the display, and (iii) a center of a field of view of the display.

5. The information processing apparatus according to claim 1, wherein, by way of the drag mode switching process, the drag control process is alternatively switched between the drag scroll mode and the drag drawing mode in response to detection of a continuous two-point touch operation on the touch screen.

6. The information processing apparatus according to claim 1, wherein, by way of the drag mode switching process, the drag control process is automatically switched from controlling in the drag scroll mode to controlling in the drag drawing mode in a case in which a touch operation on the touch screen is not detected for a predetermined period of time while the information processing apparatus is functioning in the drag scroll mode under control of the drag control process.

7. An information processing method executed by a processor of an information processing apparatus, the information processing apparatus further comprising a display and a touch screen layered on the display, the processor selectively controlling the information processing apparatus to function in (i) a drag drawing mode in which a drawing image is drawn in a drawing area on the display by way of a drag operation by a user, and (ii) a drag scroll mode in which the drawing image drawn and displayed in the drawing area on the display is scrolled by way of the drag operation on the touch screen by the user, and the method comprising:

judging whether a position of the drag operation by the user, while the information processing apparatus is functioning in the drag drawing mode under control of the processor, is positioned on a boundary indicating the drawing area; and     automatically switching from controlling in the drag drawing mode to controlling in the drag scroll mode without stopping the drag operation in a case in which the position of the drag operation by the user, while the information processing apparatus is functioning in the drag drawing mode under control of the processor, is judged to be positioned on the boundary indicating the drawing area,     wherein the drawing image in the drawing area on the display, drawn by way of the drag operation by the user, follows the drag operation by the user in the drag scroll mode, and the drawing image in the drawing area on the display, drawn by way of the drag operation by the user, is fixed in the drag drawing mode, and     wherein the processor automatically switches from controlling in the drag scroll mode to controlling in the drag drawing mode when the drawing image in the drawing area on the display is detected to be scrolled by the user to an arbitrary area defined by the user while the information processing apparatus is functioning in the drag scroll mode under control of the processor.

8. A non-transitory storage medium encoded with a computer-readable program for controlling a processor of an information processing apparatus, the information processing apparatus further comprising a display and a touch screen layered on the display, and the program being executable by the processor to control the processor to execute processes comprising:

a drag control process of selectively controlling the information processing apparatus to function in (i) a drag drawing mode in which a drawing image is drawn in a drawing area on the display by way of a drag operation by a user, and (ii) a drag scroll mode in which the drawing image drawn and displayed in the drawing area on the display is scrolled by way of the drag operation on the touch screen by the user;

a judgment process of judging whether a position of the drag operation by the user, while the information processing apparatus is functioning in the drag drawing mode under control of the drag control process, is positioned on a boundary indicating the drawing area; and     a drag mode switching process of automatically switching the drag control process from controlling in the drag drawing mode to controlling in the drag scroll mode without stopping the drag operation in a case in which the position of the drag operation by the user, while the information processing apparatus is functioning in the drag drawing mode under control of the drag control process, is judged in the judgement process to be positioned on the boundary indicating the drawing area,     wherein the drawing image in the drawing area on the display, drawn by way of the drag operation by the user, follows the drag operation by the user in the drag scroll mode, and the drawing image in the drawing area on the display, drawn by way of the drag operation by the user, is fixed in the drag drawing mode, and     wherein, by way of the drag mode switching process, the drag control process is automatically switched from controlling in the drag scroll mode to controlling in the drag drawing mode when the drawing image in the drawing area on the display is detected to be scrolled by the user to an arbitrary area defined by the user while the information processing apparatus is functioning in the drag scroll mode under control of the drag control process.

\* \* \* \* \*

UNITED STATES PATENT AND TRADEMARK OFFICE
CERTIFICATE OF CORRECTION

PATENT NO. : 9,830,069 B2
APPLICATION NO. : 14/159254
DATED : November 28, 2017
INVENTOR(S) : Tetsuji Makino et al.

It is certified that error appears in the above-identified patent and that said Letters Patent is hereby corrected as shown below:

In the Claims

Column 14, Line 50, delete "set by the user," and insert --set,--.

Signed and Sealed this
Seventeenth Day of April, 2018

Andrei Iancu
*Director of the United States Patent and Trademark Office*